(12) United States Patent
Banatwala et al.

(10) Patent No.: US 11,070,494 B2
(45) Date of Patent: *Jul. 20, 2021

(54) MANAGING EMAIL CONTENT IN AN ACTIVITY STREAM

(71) Applicant: International Business Machines Corporation, Armonk, NY (US)

(72) Inventors: Mustansir Banatwala, Hudson, NH (US); David A. Brooks, Arlington, VA (US); Scott H. Prager, Stratham, NH (US); Joseph A. Russo, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,534

(22) Filed: Jul. 16, 2018

(65) Prior Publication Data

US 2019/0140985 A1 May 9, 2019

Related U.S. Application Data

(63) Continuation of application No. 14/023,039, filed on Sep. 10, 2013, now Pat. No. 10,091,139.

(51) Int. Cl.
*H04L 12/58* (2006.01)
*G06F 3/0484* (2013.01)

(52) U.S. Cl.
CPC .......... *H04L 51/00* (2013.01); *G06F 3/04842* (2013.01); *H04L 51/16* (2013.01)

(58) Field of Classification Search
CPC ......... H04L 51/00; H04L 51/04; H04L 51/16; H06F 3/04842; G06F 3/04842
See application file for complete search history.

(56) References Cited

U.S. PATENT DOCUMENTS

| 7,113,977 | B1 * | 9/2006 | Baker | G06Q 10/107 709/206 |
| 7,509,382 | B1 * | 3/2009 | Jania | H04L 12/1831 709/206 |
| 8,166,118 | B1 | 4/2012 | Borghetti | |
| 2007/0043815 | A1 | 2/2007 | Tsang | |
| 2007/0214216 | A1 | 9/2007 | Carrer | |
| 2010/0131666 | A1 * | 5/2010 | Feinberg | H04L 67/26 709/230 |

(Continued)

FOREIGN PATENT DOCUMENTS

WO  WO-2011136822 A1  11/2011

OTHER PUBLICATIONS

Enterprise activity stream—email conversations with externals staying threaded in the stream, Library clips, Feb. 16, 2011, Library clips.

*Primary Examiner* — Jennifer N To
*Assistant Examiner* — Parmanand D Patel
(74) *Attorney, Agent, or Firm* — Fabian VanCott; Steven L. Nichols

(57) ABSTRACT

Managing email content in an activity stream includes receiving a selection of a number of criteria that indicate content to be presented in an activity stream, retrieving email content based on the number of criteria, and displaying the email content in an activity stream by referencing email data related to the metadata.

25 Claims, 8 Drawing Sheets

(56) References Cited

U.S. PATENT DOCUMENTS

| | | |
|---|---|---|
| 2010/0250683 A1 | 9/2010 | Hoyne |
| 2011/0107033 A1 | 5/2011 | Grigoriev |
| 2011/0270931 A1* | 11/2011 | Cheng .................... G06Q 10/10 709/206 |
| 2011/0270937 A1 | 11/2011 | Portilla |
| 2012/0072510 A1* | 3/2012 | Li .......................... H04L 51/14 709/206 |
| 2012/0131474 A1* | 5/2012 | Panchadsaram ..... G06Q 10/107 715/752 |
| 2012/0158494 A1 | 6/2012 | Reis |
| 2013/0124548 A1* | 5/2013 | Chhaparia ........... G06Q 10/107 707/758 |
| 2013/0204952 A1* | 8/2013 | Everton ................. H04L 51/16 709/206 |
| 2014/0249872 A1 | 9/2014 | Stephan |
| 2015/0033141 A1* | 1/2015 | Mishra ................... H04L 51/22 715/752 |

* cited by examiner

MANAGING EMAIL CONTENT IN AN ACTIVITY STREAM

RELATED APPLICATION

The present specification is a continuation, and claims the priority under 35 U.S.C. § 120, of previous U.S. patent application Ser. No. 14/028,354, entitled "Managing Email content in an Activity Stream," filed Sep. 16, 2013, which is a continuation of U.S. patent application Ser. No. 14/023,039, entitled "Managing Email content in an Activity Stream," filed Sep. 10, 2013, which application is incorporated herein by reference in its entirety.

BACKGROUND

The present invention relates to managing email content, and more specifically, to managing email content in an activity stream.

Activity streams provide a forum for users to receive notifications about particular content. These activity streams juxtapose related data and allow the user to opt-in to content of interest. For example, a social media activity stream allows a user to receive status updates for individuals in the user's network. Activity streams may be used in a professional environment to receive notifications about business-related content, such as project status, colleague status updates, posted documents, and other business related content, and also to take action against these notifications and systems.

BRIEF SUMMARY

Managing email content in an activity stream includes receiving a selection of a number of criteria that indicate email content to be presented in an activity stream, retrieving email content based on the number of criteria, and sending metadata relating to the email content to the activity stream to be presented.

Displaying email content in an activity stream includes receiving metadata related to email content retrieved based on a number of selected criteria, receiving an instruction to display the email content, and displaying the email content in an activity stream by referencing email data related to the metadata.

Managing email content in an activity stream includes receiving a selection of a number of criteria that indicate email content to be presented in an activity stream, retrieving email content based on the number of criteria, an action taken against other email content, or combinations thereof, and displaying the email content in an activity stream by referencing email data related to the metadata.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
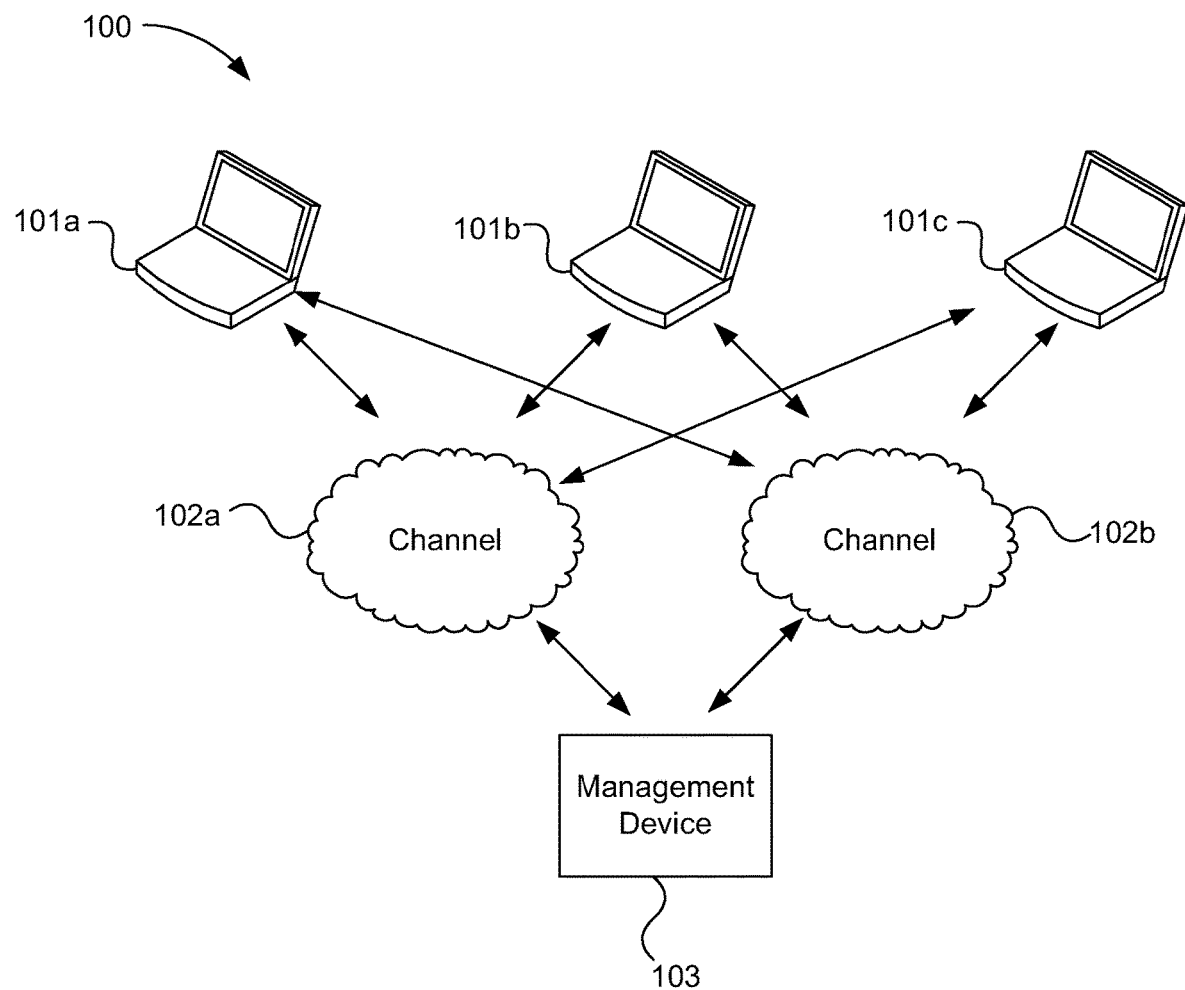
FIG. 1 is a diagram of a system for managing email content in an activity stream, according to one example of principles described herein.

The present specification describes a system and a method for managing email content in an activity stream such that selected email content is displayed in an organized and efficient manner.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

As noted above, activity streams may be used in business organizations to organize data relating to particular content of interest. By using activity streams and an opt-in feature, a user can select, filter, and distinguish content of interest from other content that is unrelated to the content of interest. Accordingly, activity streams allow a user more control over received electronic content.

However, current electronic content management systems may not address existing inefficiencies. For example, a user may receive and transmit information via many information channels. The increasing number of information channels increases the complexity of the overall information transfer infrastructure. The increased complexity may overwhelm users and may contribute to lost information.

Additionally, current methods of electronic content management may not efficiently integrate email content into an activity stream. For example, merely pushing all the email data into a user's activity stream may overwhelm the activity stream, and accordingly hinder the purpose of the activity stream to streamline the presentation of pertinent information. Accordingly, a user is overloaded with email content in the traditional email inbox and the activity stream as well and may be unable to process the email content and extract pertinent information.

Thus, the present specification describes systems and methods for managing email content in an activity stream. A management device may integrate email content into an activity stream. More specifically, the management device may receive a selection of a number of criteria. The criteria may be used to determine which email messages are to be presented in the activity stream. Additionally, the management device may receive a selection of email content via an action taken against an email message. Actions taken against an email message may include "flagging" an email message or replying to an email message. In another example, a selection of email content to display in an activity stream may be based on the sender of the email message. For example, a user's manager, or individuals in the user's network may trigger a selection of email content to be displayed in the activity stream. Email messages that satisfy these criteria, or that have had an action taken against them, may be retrieved and metadata relating to the email messages may be sent to, and be displayed in, the activity stream.

Integrating email content into an activity stream as described herein may be beneficial in that it provides an integration of email content and an activity stream in a fashion that emphasizes content of interest while distinguishing the content of interest from other unrelated content. Accordingly, a user may have more control over email content and a simpler route to take action based on the email content. More detail about the system and method will be described below.

As used in the present specification and in the appended claims, an activity stream may be an interface that presents information selected by a user. For example, an activity stream may post notifications or updates related to individuals selected by a user, topics selected by a user, or other content of interest. Additionally, email content selected by the user may be displayed, or otherwise presented, in the activity stream.

Additionally, as used in the present specification and in the appended claims, email content may include a number of email messages. For example, email content may be a single email message, multiple email messages, an email thread, multiple email threads, or combinations thereof. Email content may also include other threaded discussions and other collections of email messages. More specifically, email content may be email messages that are selected to be displayed in an activity stream.

As used in the present specification and in the appended claims, the phrase "a number of" or similar language may be any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system (100) for managing email content in an activity stream, according to one example of principles described herein. By way of introduction, via user devices (101), users may communicate with other users via a number of channels (102). A management device (103) may manage the channels (102) and integrate the data shared across the channels (102).

The system (100) may include a number of user devices (101). In one example, a user uses a user device (101) to access a channel (102). A channel (102) may be a forum that facilitates many users communicating with one another. One example of a channel (102) is an email network that allows users to share information with one another via email messages. Another example of a channel (102) is an activity stream which presents notifications and updates to content selected by a user. For example, an activity stream may post status updates to individuals in a user's network. Other examples of channels (102) include a telephone network, an instant messaging network, and a mobile texting network, among other communication networks.

As depicted in FIG. 1, users may communicate with one another via multiple channels (102). For example, a first user may receive an email message from a second user via an email network. The first user may also receive an update to a status of the second user via an activity stream. A channel (102) may include a number of engines that allow users to transmit and receive information from other users. Additionally, a user may receive and transmit information via multiple instances of a channel (102). For example, a user may have multiple email accounts through which they share information.

The users of the channels (102) may communicate with one another via a number of user devices (101). Examples of user devices (101) include desktop computers, laptop computers, smartphones, personal digital assistants (PDAs), and tablets, among other electronic devices. In other words, a user device (101) may be any electronic device that allows a user to communicate with another electronic device.

A management device (103) may manage email content in an activity stream. As described above, multiple channels (102) may lead to lost information or information overload. Accordingly, the management device (103) may integrate email content into an activity stream. More specifically, the management device (103) may facilitate the display of email content in the activity stream. For example, the management device (103) may receive an indication of a number of criteria that may be used to determine email content to be presented in the activity stream. Additionally, the management device (103) may receive an indication that an email is to be presented in the activity stream via an action taken against the email content. The management device (103) may retrieve the indicated email content, and send metadata relating to the content to an activity stream to display the email content in the activity stream. In some examples, the management device (103) may include a number of modules to carry out the functionalities described herein. For example, the management device (103) may include an email manager that manages email data in an email network. For example, the email manager may perform a number of operations described below in connection with FIGS. 2-6. Similarly, the management device (103) may include an activity stream manager that manages the activity stream. For example, the activity stream manager may present a user interface to receive a selection of a number of criteria. The activity stream manager and the email manager may be part of a single device or may be separate and distinct computing devices that includes the management device (103).

Using a management device (103) to manage email content in an activity stream may be beneficial in that it distinguishes email content selected by a user, from unrelated email content, and displays the selected email content in a forum where the email content can be easily identified and accessed by a user. In other words, using the systems and methods disclosed herein, a user may identify particular email content of interest, and have that email content displayed to them in an organized forum while unrelated email content is separated and presented in another forum.

Moreover, displaying a subset of email messages, and hiding unrelated email messages may allow a user to customize an email infrastructure and easily locate and respond to pertinent email messages via the activity stream. In other words, displaying particular email content in an activity stream may ensure that pertinent email messages are not lost in the corpus of less pertinent email messages. In summary, the systems and methods described herein provide an efficient and simple manner to distinguish, and process, user-selected email content.

Figure 2:
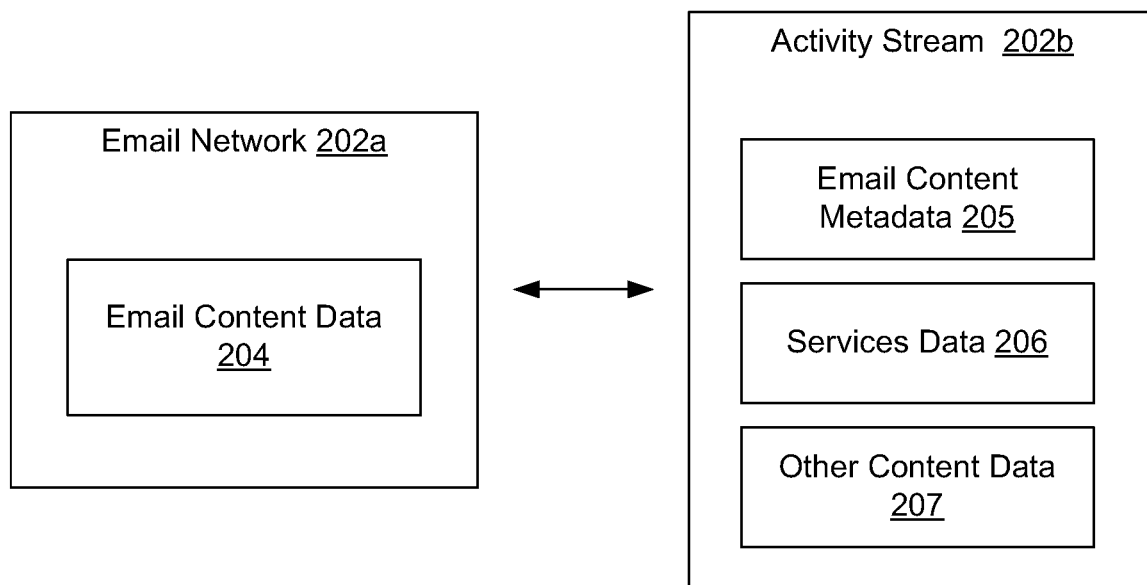
FIG. 2 is a diagram of channels, according to one example of principles described herein.

FIG. 2 is a diagram of channels, according to one example of principles described herein. More specifically, FIG. 2 depicts an email network (202a) and an activity stream (202b) according to one example of principles described herein. The email network (202a) and the activity stream (202b) may be examples of the channels (FIG. 1, 102) described in connection with FIG. 1. As described above, an email network (202a) may allow users to communicate with one another via email messages. For example, a first user may send a first email message to a second user via the email network (202a). A second user may reply to the email message, or forward the email message onto another user, using the email network (202a).

The email network (202a) may include email content data (204). Email content data (204) may be any data that relates to the email content shared via the email network (202a). As described above, email content may refer to an individual email message or multiple email messages. For example, email content may include an email thread that includes a number of email messages. The email network (202a) may be managed by an email manager operated by the management device (FIG. 1, 103).

The activity stream (202b) may post updates and notifications relating to content selected by a user. For example, the activity stream (202b) may post status updates of individuals in a user's network. In another example, the activity stream (202b) may include posted documents relating to topics selected by the user.

The activity stream (202b) may include email content metadata (205). This metadata may be used to display the email content in the activity stream (202b). The activity stream (202b) may include a set of application programming interfaces (APIs) to push email content into an activity stream interface. These APIs may be used to push email messages from the email network (202a) into the activity stream (202b). For example, via the management device (FIG. 1, 103), email content metadata (205) may be passed from the email network (202a) to the activity stream (202b). Via the management device (FIG. 1, 103), metadata relating to the email content may be sent to the activity stream (202b), while the actual email content data (204) may be retained in the email network (202a). In other words, the email content data (204) may be external to the activity stream (202b). Additionally, when there are updates to the email content data (204), i.e., forwards of and/or replies to email messages, the metadata relating to those forwards and/or replies is pulled from the email network (202a) and implemented by the activity stream (202b).

In some examples, the activity stream (202b) may include data that is not external, but rather internal, to the activity stream (202*b*). For example, services data (206) may be included in the activity stream (202*b*). Services data (206) may include any data used to implement a number of services. Examples of services include social networking services, online communities, wikis, blogs, and file sharing, among other services. Other content data (207) may also be internal to the activity stream (202*b*). Other content data (207) may include any data to present, implement or otherwise process other content. The other content data (207) may be data relating to other channels (FIG. 1, 102). For example, the activity stream (202*b*) may include other content data (207) that may be used to display content from an instant messaging channel. The activity stream (202*b*) may be managed by an activity stream manager operated by the management device (FIG. 1, 103).

Figure 3:
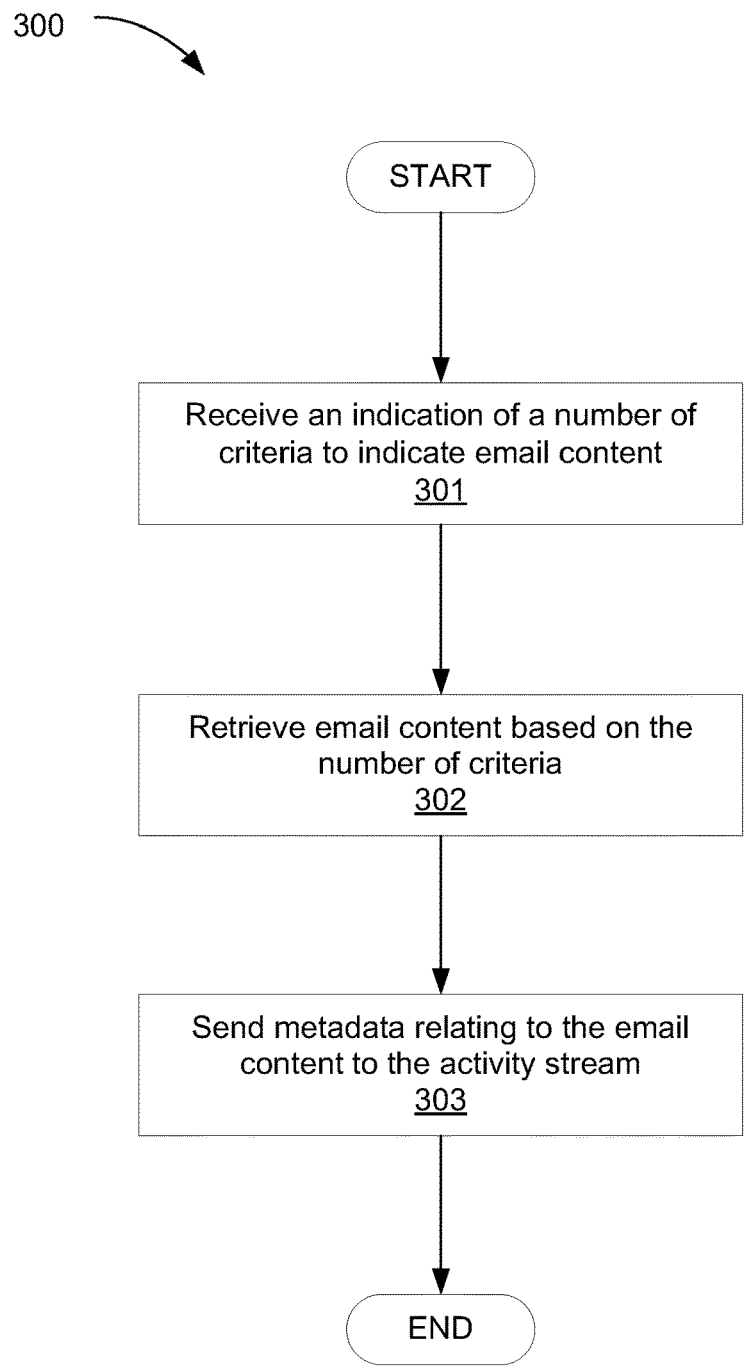
FIG. 3 is a flowchart of a method for sending email content to an activity stream, according to one example of principles described herein.

FIG. 3 is a flowchart of a method (300) for sending email content to an activity stream (FIG. 2, 202*b*), according to one example of principles described herein. The method (300) may be performed by the management device (FIG. 1, 103). Accordingly, all, or a portion, of the method (300) may be performed by the activity stream manager, the email manager, another manager of the management device (FIG. 1, 103), or combinations thereof. The management device (FIG. 1, 103) may receive (block 301) a selection of a number of criteria. The criteria may indicate email content to be presented in an activity stream (FIG. 2, 202*b*). For example, a user may select a number of criteria. Email content that satisfies the criteria may be presented in the activity stream (FIG. 2, 202*b*). The criteria may reflect an interest a user has in particular content. For example, a user may intend to follow email messages from an individual in the user's department. Accordingly, the management device (FIG. 1, 103) may receive (block 301) the selection of the individual to be followed as a criteria for displaying email content in the activity stream (FIG. 2, 202*b*).

In another example, the user may desire to follow email messages that relate to a particular topic or theme. Accordingly, the management device (FIG. 1, 103) may receive (block 301) the selection of the topic as a criteria for displaying email content in the activity stream (FIG. 2, 202*b*). Other examples of criteria that may be used to indicate email content to display in the activity stream (FIG. 2, 202*b*) include tags, groups, and communities, among other selection criteria.

The management device (FIG. 1, 103) may retrieve (block 302) email content based on the number of criteria. For example, if a particular email message, or an email thread, satisfies the received criteria, the management device (FIG. 1, 103) may identify and retrieve (block 302) that email content. In some examples, retrieving email content may be performed when the number of recipients of the email content is below a threshold number. For example, a user may select a manager as a criterion by which email content is retrieved and displayed. In this example, the user may not wish to display on his/her activity stream (FIG. 2, 202*b*), email content from the manager addressed to the entire company, for example a message including a reminder about an upcoming building renovation. However, the user may wish to display on his/her activity stream (FIG. 2, 202*b*) email content from the manager to a particular working group of which the user is a member, for example a project note. Accordingly, in addition to the criteria mentioned above, the management device (FIG. 1, 103) may retrieve (block 302) email content when the number of recipients is less than a threshold number. In some examples the threshold number may be one. In this example, email content directly, and solely, addressed to the user from the manager may be retrieved.

The management device (FIG. 1, 103) may send (block 303) metadata relating to the email content to the activity stream (FIG. 2, 202*b*) to be presented. The metadata may include information that allows the management device (FIG. 1, 103) to identify the email content to be displayed in the activity stream (FIG. 2, 202*b*). In some examples, the email content data (FIG. 2, 204) may remain on the email network (FIG. 2, 202*a*) while the email content metadata (FIG. 2, 205) may be passed to the activity stream (FIG. 2, 202*b*). As will be described below, the email content may be displayed via the activity stream (FIG. 2, 202*b*). The method (300) may be beneficial in that it may provide an opt-in feature that allows the activity stream (FIG. 2, 202*b*) to present selected email content and allow interaction with the email content without interacting with the email network (FIG. 2, 202*a*). Additionally, using the opt-in functionality presented via the selection of criteria, a user may customize the presentation of email content. More particularly, a user can display priority email content in the activity stream (FIG. 2, 202*b*) and ensure that such priority email content is separated from unrelated email content and is not lost in a cluttered email inbox.

Figure 4:
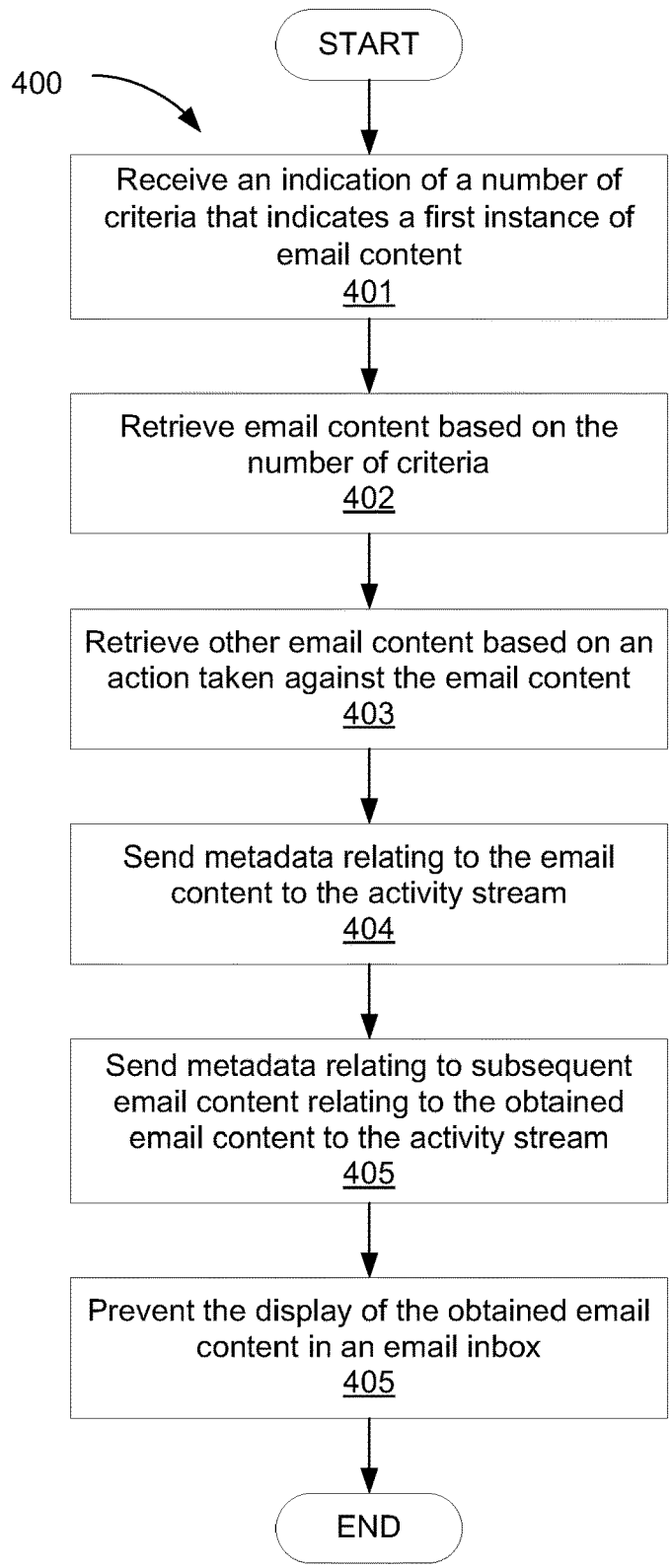
FIG. 4 is a flowchart of another method for sending email content to an activity stream, according to one example of principles described herein.

FIG. 4 is a flowchart of another method (400) for sending email content to an activity stream (FIG. 2, 202*b*), according to one example of principles described herein. The method (400) may be performed by the management device (FIG. 1, 103). Accordingly, all, or a portion, of the method (400) may be performed by the activity stream manager, the email manager, another manager of the management device (FIG. 1, 103), or combinations thereof. The management device (FIG. 1, 103) may receive (block 401) an indication of a number of criteria that indicate email content to be presented in an activity stream (FIG. 2, 202*b*). This may be performed as described in connection with FIG. 3. The number of criteria may be received via an email manager. In another example, the number of criteria may be received via an activity stream manager. In yet another example, the number of criteria may be received via another manager, a third-party manager for example.

The management device (FIG. 1, 103) may retrieve (block 402) the email content based on the number of criteria. This may be performed as described in connection with FIG. 3. In some examples, retrieving (block 402) email content based on the number of criteria may include retrieving subsequent email content that is based on the email content that satisfies the number of criteria. For example, the management device (FIG. 1, 103) may retrieve email messages that are forwards of, and/or replies to, email messages that satisfy the number of criteria. The email content may be retrieved via an email manager. In another example, the email content may be received via an activity stream manager. In yet another example, the number of criteria may be received via another manager, a third-party manager for example.

The management device (FIG. 1, 103) may retrieve (block 403) other email content based on an action taken against the other email content. As used herein, this other email content may be email content that is not retrieved based on the satisfaction of the number of criteria as described in connection with FIG. 3. For example, a user may desire to display in the activity stream (FIG. 2, 202*b*) email content that was not retrieved based on the satisfaction of the number of criteria. In this example, the user may take an action against this other email content to direct the management device (FIG. 1, 103) to display the other email content in the activity stream (FIG. 2, 202b). For example, a user may "flag" or select an icon to indicate other email content that may be retrieved and displayed in the activity stream (FIG. 2, 202b). In another example, a user may reply to the other email content. Such a reply may be an action taken against the other email content to indicate that this other email content may be retrieved and displayed in the activity stream (FIG. 2, 202b).

The management device (FIG. 1, 103) may send (block 404) metadata relating to the email content to the activity stream (FIG. 2, 202b). In some examples, this may be performed as described in connection with FIG. 3. In some examples, the management device (FIG. 1, 103) may send metadata relating to the other email content, i.e., the email content retrieved based on an action taken against the email content, to the activity stream (FIG. 2, 202b).

The management device (FIG. 1, 103) may send (block 405) metadata relating to subsequent email content related to the retrieved email content to the activity stream (FIG. 2, 202b). For example, an email thread may have been selected to be displayed in the activity stream (FIG. 2, 202b). Accordingly, subsequent email messages that are part of the email thread may be received at the email network (FIG. 2, 202a). For example, the email network (FIG. 2, 202a) may receive forwards of, or replies to, the email content. Accordingly, the management device (FIG. 1, 103) may retrieve the subsequent email content and send (block 405) metadata relating to the subsequent email content to the activity stream (FIG. 2, 202b).

The management device (FIG. 1, 103) may prevent (block 406) the display of the email content in an email inbox. For example, the metadata may have been sent to the activity stream (FIG. 2, 202b) and the management device (FIG. 1, 103) may suppress the email content in the email network (FIG. 2, 202a). As described above, the email content data (FIG. 2, 204) may still be present in the email network (FIG. 2, 202a), but the display of the email content may be prevented. Preventing the display of the email content in the email network (FIG. 2, 202a) may be beneficial in that it reduces the number of email messages in an email inbox, and reduces the duplication of information as the email content is already displayed in the activity stream (FIG. 2, 202b).

Figure 5:
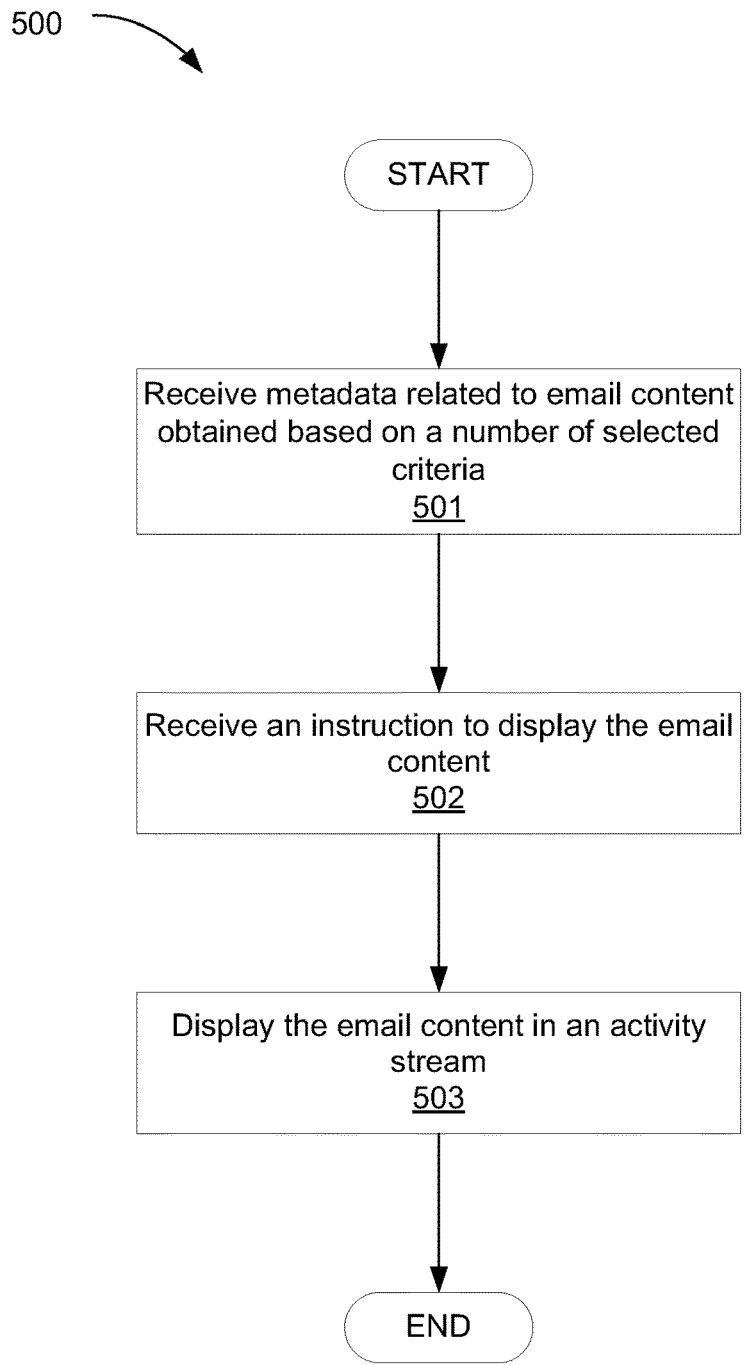
FIG. 5 is a flowchart of a method for displaying email content in an activity stream, according to one example of principles described herein.

FIG. 5 is a flowchart of a method (500) for displaying email content in an activity stream (FIG. 2, 202b), according to one example of principles described herein. The method (500) may be performed by the management device (FIG. 1, 103). More specifically, the method (500), or portions thereof, may be performed by the activity stream manager, the email manager, another manager, or combinations thereof. The activity stream manager may receive (block 501) metadata relating to email content retrieved based on a number of selected criteria. As described above, email content that satisfy a number of user-selected criteria may be retrieved by the activity stream manager. The email content metadata (FIG. 2, 205) related to the retrieved email content may be received by the activity stream (FIG. 2, 202b).

The management device (FIG. 1, 103) may receive (block 502) an instruction to display the email content. For example, a user may select summary text or another icon to direct the management device (FIG. 1, 103) to display the email content. Accordingly, the activity stream manager may display (block 503) the email content. More specifically, the management device (FIG. 1, 103) may display (block 503) the email content in the activity stream (FIG. 2, 202b). In some examples, the management device (FIG. 1, 103) may display the email content by using the metadata to reference, link, or otherwise retrieve the email content from the email network (FIG. 2, 202a).

In some examples, the email content may be exclusively displayed in the activity stream (FIG. 2, 202b). For example, an email manager may prevent the email content from being displayed on the email network (FIG. 2, 202a). In other examples, other channels (FIG. 1, 102) may also be prevented from displaying the email content. Exclusively displaying the email content in the activity stream (FIG. 2, 202b) may be beneficial in that it simplifies the presentation of email information, thus reducing the likelihood of lost information, information overload, and information duplication.

Figure 6:
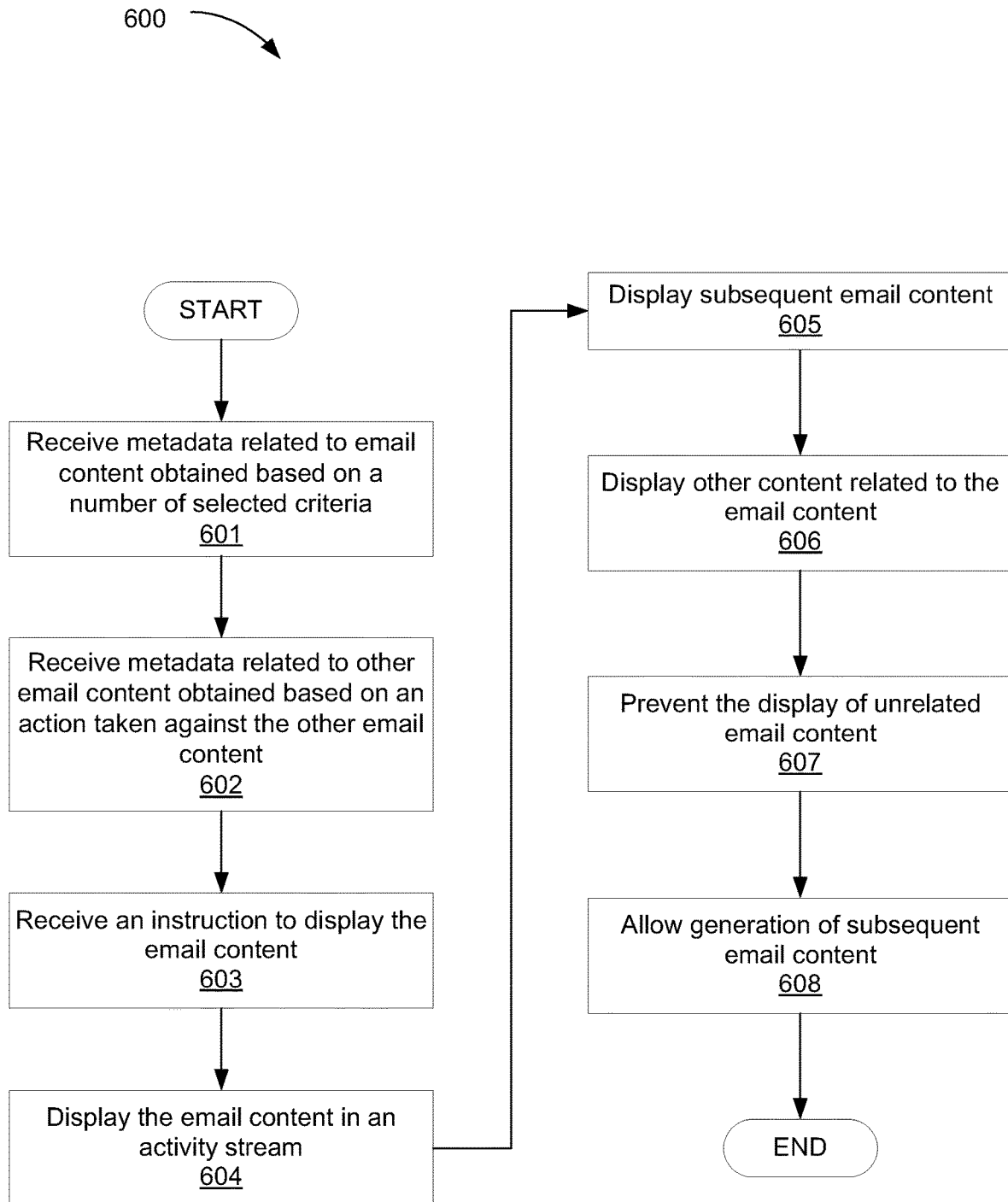
FIG. 6 is a flowchart of another method for displaying email content in an activity stream, according to one example of principles described herein.

FIG. 6 is a flowchart of another method (600) for displaying email content in an activity stream (FIG. 2, 202b), according to one example of principles described herein. The method (600) may be performed by the management device (FIG. 1, 103). Accordingly, all, or a portion, of the method (600) may be performed by the activity stream manager, the email manager, another manager of the management device (FIG. 1, 103), or combinations thereof. The management device (FIG. 1, 103) may receive (block 601) metadata related to email content retrieved based on a number of selected criteria. In some examples, this may be performed as described in connection with FIG. 5.

The management device (FIG. 1, 103) may receive (block 602) metadata relating to other email content retrieved based on an action taken against the other email content. As described above, email content that does not satisfy a number of user-selected criteria may be retrieved by the activity stream manager when a user takes an action, such as selecting an icon, or responding to the other email content. Accordingly, email content metadata (FIG. 2, 205) for the other email content may be received by the activity stream (FIG. 2, 202b). Additionally, the management device (FIG. 1, 103) may receive metadata relating to subsequent email messages related to the email content, the other email content, or combinations thereof.

The management device (FIG. 1, 103) may receive (block 603) an instruction to display the email content. In some examples, this may be performed as described in connection with FIG. 5.

The management device (FIG. 1, 103) may display (block 604) the email content in an activity stream (FIG. 2, 202b). In some examples, this may be performed as described in connection with FIG. 5.

The management device (FIG. 1, 103) may display (block 605) subsequent email content. For example, the management device (FIG. 1, 103) may display (block 605), via the activity stream (FIG. 2, 202b), subsequent email content that include replies to and/or forwards of the email content.

The management device (FIG. 1, 103) may display (block 606) other content related to the email content. As described above, the activity stream (FIG. 2, 202b) may also include service data (FIG. 2, 206) and other content data (FIG. 2, 207). Accordingly, the management device (FIG. 1, 103) may display (block 606) other content relating to the service data (FIG. 2, 206) and other content data (FIG. 2, 207). For example, the activity stream (FIG. 2, 202b) may display icons that direct a user to blogs, wikis, forums, or other resources. In some examples, the other content may be related to the email content. For example, a user may indicate email content relating to the topic of "human resources" to be displayed in the activity stream (FIG. 2, 202b). Accordingly, blogs, wikis, forums, or other resources related to "human resources" may be displayed on the activity stream (FIG. 2, 202b).

The management device (FIG. 1, 103) may also prevent (block 607) the display of unrelated email content. As used herein unrelated email content may refer to email messages that 1) do not satisfy the selected criteria, 2) have not had an action taken against them, and 3) are not subsequent email messages of retrieved email content. For example, email content that does not satisfy the selected criteria, was not retrieved based on an action taken against email content, nor that is subsequent email content may not be presented in the activity stream (FIG. 2, 202b). Preventing the display of unrelated email content may be beneficial in that it simplifies, and de-clutters the email content displayed in the activity stream (FIG. 2, 202b), thus enhancing the effect of the activity stream (FIG. 2, 202b) to provide a simple and efficient display of material, including email content, selected by a user.

The management device (FIG. 1, 103) may allow (block 608) the generation of subsequent email content. More specifically, the management device (FIG. 1, 103) may allow a user, via the activity stream (FIG. 2, 202b) to reply to, or forward, email messages included in the retrieved email content. Doing so may be beneficial in that it provides a single location where a user can both access, and respond to email messages, rather than viewing email content in the activity stream (FIG. 2, 202b), and returning to the email network (FIG. 2, 202a) to interact with the email content.

Figure 7:
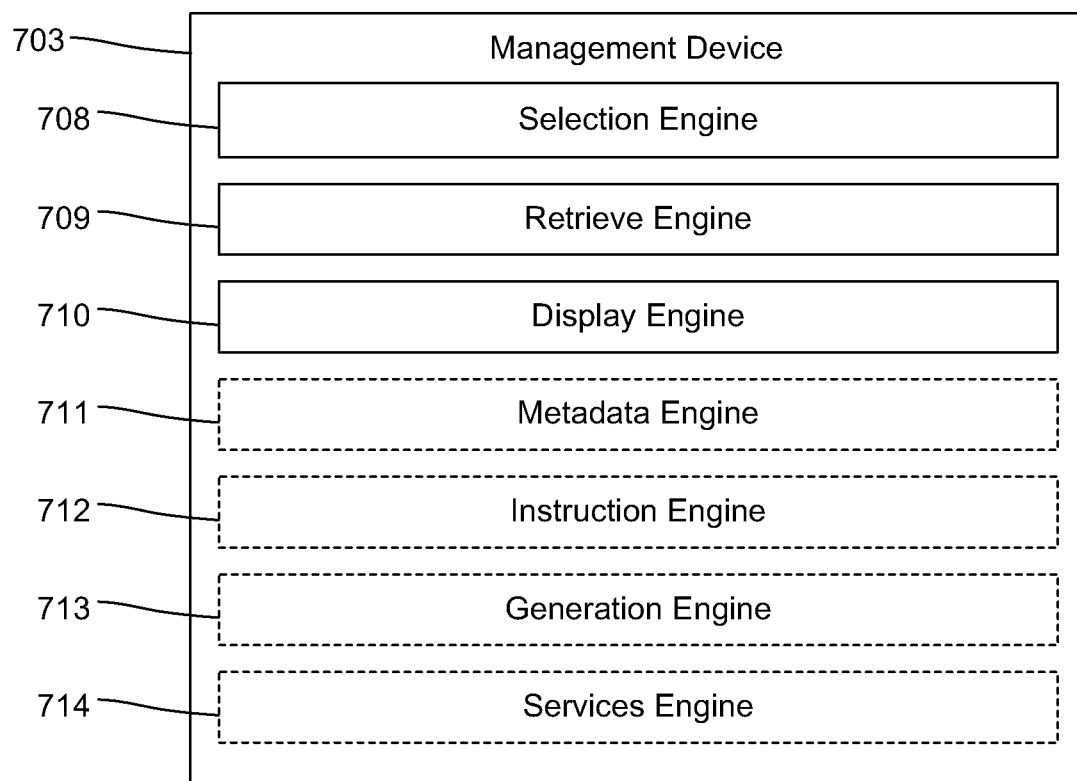
FIG. 7 is a diagram of an example of a management device, according to the principles described herein.

FIG. 7 is a diagram of an example of a management device (703) according to the principles described herein. The management device (703) may be an example of the management device (FIG. 1, 103) described in connection with FIG. 1. The management device (703) may include a selection engine (708), a retrieve engine (709), and a display engine (710). In this example, the management device (703) may also include a metadata engine (711), an instruction engine (712), a generation engine (713) and a services engine (714). The engines (708, 709, 710, 711, 712, 713, 714) refer to a combination of hardware and program instructions to perform a designated function. Each of the engines (708, 709, 710, 711, 712, 713, 714) may include a processor to execute the designated function of the engine. As described above, the management device (FIG. 1, 103) may include an email manager, an activity stream manager, another manager, or combinations thereof. Accordingly, any combination of any number of the engines (708, 709, 710, 711, 712, 713, 714) may be part of the email manager, the activity stream manager, or another manager.

The selection engine (708) may receive a selection of a number of criteria that indicate email content to be presented in an activity stream (FIG. 2, 202b). The number of criteria may include individuals, topics, tags, groups, and communities, or combinations thereof.

The retrieve engine (709) may retrieve email content. Specifically, the retrieve engine (709) may retrieve email content based on the number of criteria. Email content may be a number of email messages, a number of email threads, or combinations thereof. In some examples, the retrieve engine (709) may retrieve other email content based on an action taken against the email content. For example, the retrieve engine (709) may retrieve email content when an icon is selected, or when the email content is replied to. In some examples, the retrieve engine (709) may retrieve email content when the number of recipients of the email content is less than a threshold number.

The display engine (710) may display email content in an activity stream (FIG. 2, 202b). Displaying email content may include displaying subsequent email content in the activity stream (FIG. 2, 202b). In some examples, the display engine (710) exclusively displays the email content in the activity stream (FIG. 2, 202b). In other words, the display engine (710) may prevent the display of the email content in an email inbox. The display engine (710) may display other content related to the email content in the activity stream (FIG. 2, 202b). For example, the display engine (710) may display service interfaces in the activity stream (FIG. 2, 202b). The display engine (710) may prevent the display of unrelated email content in the activity stream (FIG. 2, 202b).

The metadata engine (711) may send and receive metadata relating to email content that was retrieved based on a number of selected criteria. The metadata engine (711) may also send and receive metadata relating to other email content that was retrieved based on an action being taken against the other email content. The metadata engine (711) may also send and receive metadata relating to subsequent email content that are replies to, or forwards of the retrieved email content, the retrieved other email content, or combinations thereof.

The generation engine (713) may allow generation of subsequent email content based on the displayed email content. For example, the generation engine (713) ma allow the generation of subsequent email content from the activity stream (FIG. 2, 202b) without interacting with an email network (FIG. 2, 202a). The services engine (714) may provide services related to the email content.

Figure 8:
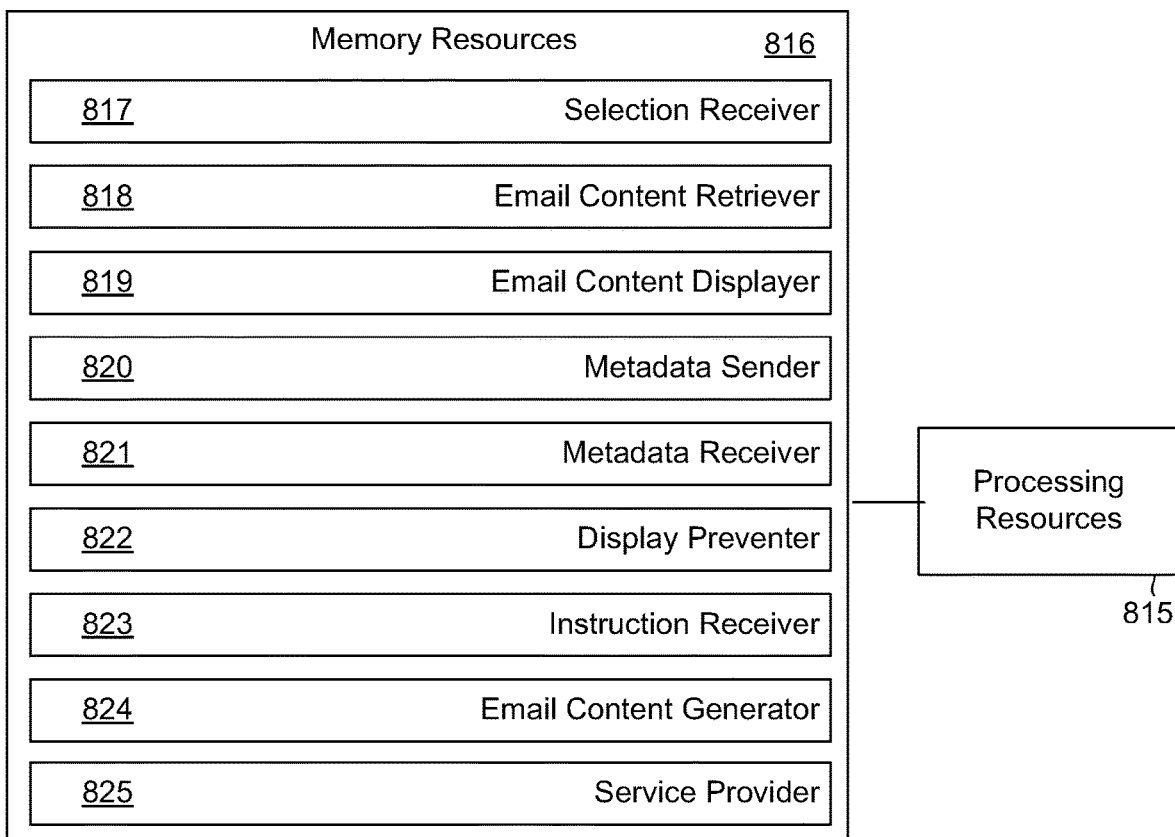
FIG. 8 is a diagram of an example of a management device, according to the principles described herein.

FIG. 8 is a diagram of an example of a management device (803), according to the principles described herein. The management device (803) may be an example of the management device (FIG. 1, 103) described in connection with FIG. 1. In this example, the management device (803) may include processing resources (815) that are in communication with memory resources (816). Processing resources (815) may include at least one processor and other resources used to process programmed instructions. The memory resources (816) represent generally any memory capable of storing data such as programmed instructions or data structures used by the management device (803). The programmed instructions shown stored in the memory resources (816) may include a selection receiver (817), an email content retriever (818), an email content displayer (819), a metadata sender (820), a metadata receiver (821), a display preventer (822), an instruction receiver (823), an email content generator (824), and a service provider (825).

The memory resources (816) include a computer readable storage medium that contains computer readable program code to cause tasks to be executed by the processing resources (815). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The selection receiver (817) represents programmed instructions that, when executed, cause the processing resources (815) to receive a selection of a number of criteria to indicate email content to be presented in an activity stream. The email content retriever (818) represents programmed instructions that, when executed, cause the processing resources (815) to retrieve email content based on 1) the number of criteria, 2) an action taken against the email content. The email content displayer (819) represents programmed instructions that, when executed, cause the processing resources (815) to display the email content, other email content, other content, or combinations thereof in an activity stream. The metadata sender (820) represents programmed instructions that, when executed, cause the processing resources (815) to send metadata relating to the email content, other email content, subsequent email content, or combinations thereof to the activity stream to be presented. The metadata receiver (821) represents programmed instructions that, when executed, cause the processing resources (815) to receive metadata relating to the email content, other email content, subsequent email content, or combinations thereof. The display preventer (822) represents programmed instructions that, when executed, cause the processing resources (815) to prevent the display of email content in the email inbox and prevent the display of unrelated email content in the activity stream (FIG. 2, 202*b*). The instruction receiver (823) represents receive an instruction to display the email content. The email content generator (824) represents programmed instructions that, when executed, cause the processing resources (815) to allow generation of subsequent email content in the activity stream (FIG. 2, 202*b*). The service provider (825) represents programmed instructions that, when executed, cause the processing resources (815) to provide services related to the email content.

Further, the memory resources (816) may be part of an installation package. In response to installing the installation package, the programmed instructions of the memory resources (816) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (815) and the memory resources (816) are located within the same physical component, such as a server, or a network component. The memory resources (816) may be part of the physical component's main memory, caches, registers, non-volatile memory, or elsewhere in the physical component's memory hierarchy. Alternatively, the memory resources (816) may be in communication with the processing resources (815) over a network. Further, the data structures, such as the libraries, may be accessed from a remote location over a network connection while the programmed instructions are located locally. Thus, the management device (803) may be implemented on a user device, on a server, on a collection of servers, or combinations thereof.

The management device (803) of FIG. 8 may be part of a general purpose computer. However, in alternative examples, the management device (803) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A computer program product for managing email content in an activity stream, the computer program product comprising:
   a non-transitory computer readable storage medium comprising computer usable program code embodied therewith, the computer usable program code comprising computer usable program code, when executed by a processor, to:
   allow generation of at least one of a forward of or a reply to the email content in the activity stream.

2. A system for displaying email content in an activity stream, comprising:
   a selection engine to receive user selection of a number of criteria to distinguish email content to be presented in the activity stream from unrelated email content to be displayed in an email network, wherein:
   the email network allows users to communicate via email messages; and
   the activity stream is a separate channel from the email network and presents notifications and updates to content selected by a user;
   a retrieve engine to:
   retrieve, when a number of recipients of email content is less than a threshold amount and based on satisfaction of the number of criteria the email content to be presented in the activity stream;
   retrieve additional content from outside of the email network and the activity stream, which additional content is related to a topic of the email content to be presented in the activity stream; and
   retrieve subsequent email content that is at least one of a forward of or reply to the email content that satisfies the number of criteria;
   receive a user selection of a number of criteria to distinguish email content to be displayed in the activity stream from unrelated email content to be displayed in an email network, wherein:
   the email network allows users to communicate via email messages; and the activity stream is a separate channel from the email network and presents notifications and updates to content selected by a user;

retrieve, when a number of recipients is less than a threshold amount and based on satisfaction of the number of criteria, the email content to be presented in the activity stream;

retrieve subsequent email content that is at least one of a forward of or reply to the email content that satisfies the number of criteria;

display the email content to be presented in the activity stream in the activity stream by referencing metadata relating to the email content, which metadata is passed to the activity stream;

prevent the email content to be presented in the activity stream from being displayed in the email network, wherein the email content is retained in the email network;

retrieve additional content from outside of the email network and the activity stream, which additional content is related to a topic of the email content to be displayed in the activity stream;

display the additional content in the activity stream; and a display engine to:

display the email content to be presented in the activity stream in the activity stream by referencing metadata relating to the email content, which metadata is passed to the activity stream;

display in the activity stream, the additional content; and prevent the email content to be presented in the activity stream from being displayed in the email network, wherein the content is retained in the first channel; and a management device to allow generation of at least one of a forward of or a reply to the email content in the activity stream.

3. The system of claim 2, wherein the selection engine is to receive user selection of other email content to be presented in the activity stream via an action taken against the other email content.

4. The system of claim 2, further comprising a metadata engine to send metadata relating to the email content to the activity stream while the email content remains on the email network.

5. The system of claim 2, wherein receiving user selection of a number of criteria comprises receiving user selection of content of interest.

6. The system of claim 2, wherein email content is pushed from the email network into the activity stream.

7. The system of claim 2, further comprising:

an email network manager to manage email network content; and an activity stream manager to manage activity stream content, wherein user selection of content of interest is received by at least one of the email network manager and the activity stream manager.

8. The system of claim 2, wherein the display engine prevents the content from being displayed in other channels.

9. The system of claim 2, wherein the email content to be displayed in the activity stream is selected based on a sender of the email content.

10. The system of claim 2, wherein the retrieve engine is to pull updates relating to the email content to be presented in the activity stream into the activity stream.

11. The computer program product of claim 1, wherein the tangible computer readable storage medium further comprises computer usable program code, when executed by a processor, to receive user selection of other email content to be presented in the activity stream via an action taken against the other email content.

12. The computer program product of claim 1, wherein the tangible computer readable storage medium further comprises computer usable program code, when executed by a processor, to send metadata relating to the email content to the activity stream while the email content remains on the email network.

13. The computer program product of claim 1, wherein receiving user selection of a number of criteria comprises receiving user selection of content of interest.

14. The computer program product of claim 1, wherein email content is pushed from the email network into the activity stream.

15. The computer program product of claim 1, wherein the tangible computer readable storage medium further comprises computer usable program code, when executed by a processor, to receive a selection of content of interest by at least one of an email network manager and an activity stream manager.

16. The computer program product of claim 1, wherein the tangible computer readable storage medium further comprises computer usable program code, when executed by a processor, to prevent the content from being displayed in other channels.

17. The computer program product of claim 1, wherein the email content to be displayed in the activity stream is selected based on a sender of the email content.

18. A method comprising:

receiving a user selection of a number of criteria to distinguish email content to be displayed in the activity stream from unrelated email content to be displayed in an email network, wherein:

the email network allows users to communicate via email messages; and the activity stream is a separate channel from the email network and presents notifications and updates to content selected by a user;

retrieving, when a number of recipients is less than a threshold amount and based on satisfaction of the number of criteria, the email content to be presented in the activity stream;

retrieving subsequent email content that is at least one of a forward of or reply to the email content that satisfies the number of criteria;

displaying the email content to be presented in the activity stream in the activity stream by referencing metadata relating to the email content, which metadata is passed to the activity stream;

preventing the email content to be presented in the activity stream from being displayed in the email network, wherein the email content is retained in the email network;

retrieving additional content from outside of the email network and the activity stream, which additional content is related to a topic of the email content to be displayed in the activity stream;

displaying the additional content in the activity stream; and allowing generation of at least one of a forward of or a reply to the email content in the activity stream.

19. The method of claim 18, further comprising receiving user selection of other email content to be presented in the activity stream via an action taken against the other email content.

20. The method of claim 18, further comprising sending metadata relating to the email content to the activity stream while the email content remains on the email network.

21. The method of claim 18, wherein receiving user selection of a number of criteria comprises receiving user selection of content of interest.

22. The method of claim 18, wherein email content is pushed from the email network into the activity stream.

23. The method of claim 18, further comprising receiving a selection of content of interest by at least one of an email network manager and an activity stream manager.

24. The method of claim 18, further comprising preventing the content from being displayed in other channels.

25. The method of claim 18, wherein the email content to be displayed in the activity stream is selected based on a sender of the email content.

* * * * *